(12) United States Patent
Kuratani et al.

(10) Patent No.: US 11,088,587 B2
(45) Date of Patent: Aug. 10, 2021

(54) MOTOR

(71) Applicant: NIDEC SANKYO CORPORATION, Nagano (JP)

(72) Inventors: Hiroki Kuratani, Nagano (JP); Takashi Yamamoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 91 days.

(21) Appl. No.: 16/345,239

(22) PCT Filed: Oct. 25, 2017

(86) PCT No.: PCT/JP2017/038446
§ 371 (c)(1),
(2) Date: Apr. 25, 2019

(87) PCT Pub. No.: WO2018/079578
PCT Pub. Date: May 3, 2018

(65) Prior Publication Data
US 2019/0280552 A1 Sep. 12, 2019

(30) Foreign Application Priority Data

Oct. 26, 2016 (JP) .............................. JP2016-209341

(51) Int. Cl.
*H02K 5/12* (2006.01)
*H02K 5/124* (2006.01)
(Continued)

(52) U.S. Cl.
CPC ............ *H02K 5/124* (2013.01); *F04D 13/06* (2013.01); *F04D 29/426* (2013.01); *F16B 7/20* (2013.01);
(Continued)

(58) Field of Classification Search
CPC .. H02K 5/00; H02K 5/02; H02K 5/08; H02K 5/12; H02K 5/124; H02K 5/15;
(Continued)

(56) References Cited

U.S. PATENT DOCUMENTS 4,728,835 A * 3/1988 Baines ................... H02K 5/145
310/239
5,021,048 A 6/1991 Buckholtz
(Continued)

FOREIGN PATENT DOCUMENTS

CN 1222863 7/1999
CN 1525629 9/2004
(Continued)

OTHER PUBLICATIONS

"Office Action of China Counterpart Application", dated Jun. 19, 2020, with English translation thereof, pp. 1-20.
(Continued)

*Primary Examiner* — Tran N Nguyen
(74) *Attorney, Agent, or Firm* — JCIPRNET

(57) ABSTRACT

A motor provided with: a resin sealing member that is made from a resin and that covers a stator; and a cover member that is fixed to the resin sealing member. The protrusions protruding radially outward are formed on the resin sealing member. A part of the cover member on a Z2 direction side thereof is configured as a cylindrical cover section covering the resin sealing member from the outer circumferential side. The cover section has formed therein notch sections, engagement grooves that extend toward one side in the circumferential direction from the ends of the notch sections on a Z1 direction side and with which the protrusions engage, and a stopper restricting movement of the cover member toward the other side in the circumferential direc-
(Continued)

tion. The widths of the notch sections are wider than the widths of the protrusions in the circumferential direction.

7 Claims, 8 Drawing Sheets

(51) Int. Cl.
*F04D 29/42* (2006.01)
*H02K 5/02* (2006.01)
*H02K 15/12* (2006.01)
*F16B 7/20* (2006.01)
*F04D 13/06* (2006.01)
*H02K 5/08* (2006.01)
*H02K 7/14* (2006.01)

(52) U.S. Cl.
CPC ............... *H02K 5/02* (2013.01); *H02K 5/08* (2013.01); *H02K 7/14* (2013.01); *H02K 15/12* (2013.01); *H02K 15/125* (2013.01)

(58) Field of Classification Search
CPC ........... H02K 7/00; H02K 7/14; H02K 15/00; H02K 15/12; H02K 15/125
See application file for complete search history.

(56) References Cited

U.S. PATENT DOCUMENTS

| | | | |
|---|---|---|---|
| 5,096,158 A | 3/1992 | Burdick et al. | |
| 5,246,202 A | 9/1993 | Beamer | |
| 5,411,115 A | 5/1995 | Shropshire | |
| 5,964,694 A | 10/1999 | Siess et al. | |
| 6,058,593 A | 5/2000 | Siess | |
| 6,139,487 A | 10/2000 | Siess | |
| 6,170,275 B1 | 1/2001 | Ueno et al. | |
| 7,038,336 B2 | 5/2006 | Takano | |
| 8,513,846 B2 | 8/2013 | Ogino et al. | |
| 9,876,414 B2 | 1/2018 | Yoshida et al. | |
| 2002/0113506 A1* | 8/2002 | Wong | H02K 5/15 310/89 |
| 2009/0081059 A1* | 3/2009 | Seki | F04D 13/064 417/420 |
| 2010/0127587 A1* | 5/2010 | Qin | H02K 5/148 310/89 |
| 2013/0249329 A1* | 9/2013 | Yamada | H02K 3/50 310/43 |
| 2013/0300225 A1 | 11/2013 | Kurozumi et al. | |

FOREIGN PATENT DOCUMENTS

| | | |
|---|---|---|
| CN | 101392753 | 3/2009 |
| CN | 101981786 | 2/2011 |
| CN | 102472271 | 5/2012 |
| CN | 203010084 | 6/2013 |
| CN | 103326518 | 9/2013 |
| CN | 103339837 | 10/2013 |
| CN | 103621608 | 3/2014 |
| CN | 204118908 | 1/2015 |
| CN | 205108522 | 3/2016 |
| CN | 106208424 | 12/2016 |
| JP | 39-016077 | 6/1964 |
| JP | S5339407 | 4/1978 |
| JP | S5692458 | 7/1981 |
| JP | 2000253612 | 9/2000 |
| JP | 3171841 | 6/2001 |
| JP | 2003102141 | 4/2003 |
| JP | 2005184958 | 7/2005 |
| JP | 2008144717 | 6/2008 |
| JP | 2009074433 | 4/2009 |
| JP | 2011169247 | 9/2011 |
| JP | 3171841 | 11/2011 |
| JP | 2013201809 | 10/2013 |
| JP | 2016003580 | 1/2016 |
| JP | 2016128686 | 7/2016 |
| KR | 100374397 | 3/2003 |

OTHER PUBLICATIONS

"International Search Report (Form PCT/ISA/210) of PCT/JP2017/038446," dated Jan. 30, 2018, with English translation thereof, pp. 1-6.

Office Action of China Counterpart Application, with English translation thereof, dated Apr. 26, 2021, pp. 1-16.

"Office Action of China Counterpart Application", dated Dec. 8, 2020, with English translation thereof, pp. 1-17.

* cited by examiner

MOTOR

CROSS-REFERENCE TO RELATED APPLICATION

This application is a 371 application of the International PCT application serial no. PCT/JP2017/038446, filed on Oct. 25, 2017, which claims priority benefits of Japan Patent Application No. 2016-209341 filed on Oct. 26, 2016. The entirety of each of the abovementioned patent applications is hereby incorporated by reference herein and made a part of this specification.

TECHNICAL FIELD

The present invention relates to a motor in which at least a part of a stator is covered by a resin sealing member.

BACKGROUND ART

Conventionally, a pump device including an impeller and a motor structured to rotate the impeller is known (see in Patent Literature 1). In the pump device described in the patent literature, the motor includes a rotor having a drive magnet and a cylindrical tube-shaped stator which is disposed on an outer peripheral side of the rotor. The impeller and the motor are disposed in an inside of a case body structured of a housing and an upper case which covers an upper part of the housing. An upper end side of a fixed shaft which rotatably supports the rotor is fixed to the upper case. The housing includes a partition member which separates a pump chamber in which the impeller is disposed from the stator, and a sealing part made of a resin which covers the stator from an outer peripheral side, an upper side and a lower side. The partition member is formed in a bottomed cylindrical shape having a cylindrical part, a bottom part, and a flange part. The flange part is in close contact with the upper end face of the sealing part. Further, the cylindrical part covers the stator from the inner peripheral side, and the stator is completely covered by the partition member and the sealing part.

Further, in the pump device described in the abovementioned Patent Literature, the sealing part is formed of BMC (Bulk Molding Compound). The sealing part is formed so that the partition member to which the stator has been fixed is disposed in an inside of a die and that resin material is injected into the die and cured. That is, the sealing part is integrally formed with the partition member. Further, the sealing part is provided with a main body part in a substantially cylindrical tube shape which covers the stator and a screw fixing part which is protruded from an outer peripheral face of the main body part to an outer side in a radial direction. In the pump device, the upper case and the sealing part are fixed to each other with screws and a fixed hole into which a tip end of the screw is screwed is formed in the screw fixing part of the sealing part.

CITATION LIST

Patent Literature

[Patent Literature 1] Japanese Patent Laid-Open No. 2016-3580

SUMMARY OF INVENTION

Technical Problem

In the pump device described in Patent Literature 1, screws for fixing the upper case to the sealing part are required. Further, in the pump device, it is difficult to manufacture the fixed hole in the screw fixing part when the sealing part formed of BMC is resin-molded and thus a forming process of the fixed holes is required to be performed after a molding step of the sealing part is performed. Therefore, in the pump device, a component cost and a manufacturing cost of the pump device are increased. In other words, a cost of the pump device is increased.

In addition, in the pump device described in Patent Literature 1, since the sealing part and the partition member are integrally formed, for example, when an unexpected external force acts on the pump device, the upper end face of the sealing part peels off of the flange part of the partition member, and there is a possibility that a gap may be generated at a boundary between the flange part of the partition member and the upper end face of the sealing part. In addition, if a gap is generated between the flange part of the partition member and the upper end face of the sealing part, there is a possibility that a fluid such as water may infiltrate the inner peripheral side of the stator not covered by the sealing part through the gap.

A first object of the present invention is to provide a motor which includes a resin sealing member which covers the stator and a cover member which supports a rotation shaft that is a part of the rotor and is fixed to the resin sealing member, wherein a cost of the motor can be reduced. In addition, a second object of the present invention is to provide a motor which includes a resin sealing member which covers the stator and is capable of restraining entry of a fluid into the inner peripheral side of the stator.

Solution to Problem

In order to solve the above-described first problem, a motor of the present invention includes a rotor having a rotation shaft and a drive magnet, a stator which is formed in a tube shape and is disposed on an outer peripheral side of the rotor, a resin sealing member made of resin, wherein one direction in an axial direction of the rotor is referred to as a first direction and a direction opposite to the first direction is referred to as a second direction, and the resin sealing member at least covers a side in the second direction of the stator and the outer peripheral side of the stator, and a cover member which is fixed to an end side in the first direction of the resin sealing member and supports the rotation shaft. The resin sealing member is formed with a plurality of protrusions which protrude from an outer peripheral face of the resin sealing member toward an outer side in a radial direction of the rotor, and a portion on the second direction side of the cover member is formed to be a cover part in a tube shape which covers the resin sealing member from an outer peripheral side. The cover part is formed with a plurality of notch sections which are cut out from an end in the second direction of the cover part to the first direction, a plurality of engagement grooves which extend to one side in a circumferential direction of the rotor from respective end sides in the first direction of the plurality of the notch sections and are respectively engaged with the plurality of the protrusions, and a stopper which restricts movement of the cover member to the other side in the circumferential direction in a state that the protrusions are engaged with the engagement grooves. A width in the circumferential direction of each of the notch sections is wider than a width in the circumferential direction of each of the protrusions.

In the pump device, a plurality of protrusions which protrude from an outer peripheral face of the resin sealing member toward an outer side in a radial direction is formed in the resin sealing member, and a cover part of the cover member which covers the resin sealing member from an outer peripheral side is formed with a plurality of notch sections which are cut out from an end in the second direction of the cover part to the first direction, a plurality of engagement grooves which extend to one side in a circumferential direction of the rotor from respective end sides in the first direction of the plurality of the notch sections and are respectively engaged with the plurality of the protrusions, and a stopper which restricts movement of the cover member to the other side in the circumferential direction in a state that the protrusions are engaged with the engagement grooves. Further, in the present invention, a width of the notch section in the circumferential direction is set to be wider than a width of the protrusion in the circumferential direction.

Therefore, in the present invention, the cover member is assembled to the resin sealing member from the first direction side toward the second direction so that the protrusions are passed through the notch sections and then, the cover member is turned to the other side in the circumferential direction and, as a result, the cover member is fixed to the resin sealing member. Accordingly, in the present invention, screws for fixing the cover member to the resin sealing member are not required. Further, in the present invention, the protrusion which is formed in the resin sealing member is protruded from an outer peripheral face of the resin sealing member and thus, even when the resin sealing member is formed of BMC, the protrusion can be easily formed in a molding step of the resin sealing member.

As described above, in the present invention, screws for fixing the cover member to the resin sealing member are not required and thus a component cost of the motor can be reduced. Further, in the present invention, even when the resin sealing member is, for example, formed of BMC, the protrusion can be easily formed in a molding step of the resin sealing member and thus a manufacturing cost of the motor can be reduced. Therefore, according to at least an embodiment of the disclosure, a cost of the motor can be reduced.

In the present invention, the stopper is formed on the other end side in the circumferential direction of one of the engagement grooves and, when the engagement groove where the stopper is formed is referred to as a first engagement groove, the cover part is formed with a plurality of connected parts each of which connects both ends in the axial direction on the other side in the circumferential direction of each of the remaining engagement grooves except the first engagement groove. According to this structure, even when the engagement grooves are formed in the cover part so as to be extended from the end sides in the first direction of the notch sections to one side in the circumferential direction, strength in the axial direction of the cover part can be increased. Further, according to this structure, both ends in the axial direction of the first engagement groove where the stopper is formed are not connected with each other on the other side in the circumferential direction and thus a portion where the stopper is formed can be easily resiliently bent in the axial direction and the stopper can be easily engaged with the protrusion.

In the present invention, each of the plurality of the connected parts connects both ends in the circumferential direction of each of the remaining notch sections except the notch section connected with the first engagement groove, and covers each of the remaining notch sections except the notch section connected with the first engagement groove from an outer side in the radial direction. According to this structure, for example, when a predetermined member is inserted into the notch section or, when an adhesive is filled in the notch section, fixed strength of the cover member to the resin sealing member can be increased.

In the present invention, the resin sealing member is formed with four protrusions at a predetermined pitch in the circumferential direction, the cover part is formed with four notch sections and four engagement grooves at the same pitch in the circumferential direction as the four protrusions and, when each of the two engagement grooves adjacent to the first engagement groove in the circumferential direction is referred to as a second engagement groove, and a remaining engagement groove of the four engagement grooves except the first engagement groove and the second engagement grooves is referred to as a third engagement groove, the cover member is positioned in the circumferential direction with respect to the resin sealing member by the protrusion engaged with the first engagement groove and the stopper and by the protrusion engaged with the third engagement groove and the third engagement groove, and the cover member is positioned in the axial direction with respect to the resin sealing member by the protrusion engaged with the second engagement groove and the second engagement groove and by the protrusion engaged with the third engagement groove and the third engagement groove. According to this structure, the cover member can be positioned with respect to the resin sealing member in the circumferential direction and the axial direction in a well-balanced manner.

In the present invention, at least one of a side face on the first direction side of the engagement groove and a side face on the second direction side of the engagement groove is preferably formed with a protruded part which is protruded in the axial direction. According to this structure, the protrusion can be engaged with the engagement groove in a state that the protrusion is contacted with the protruded part and thus the cover member can be positioned in the axial direction with respect to the resin sealing member with a high degree of accuracy.

In the present invention, the stator includes a plurality of drive coils, and a stator core provided with a plurality of salient pole parts each of which is wound with each of the plurality of the drive coils and an outer peripheral ring part formed in a ring shape. The plurality of the salient pole parts is protruded toward an inner side in the radial direction from the outer peripheral ring part. An end face on the first direction side of the outer peripheral ring part and faces on the first direction side of the protrusions are formed to be flat faces perpendicular to the axial direction, and a part of the end face on the first direction side of the outer peripheral ring part is formed as an exposed face which is not covered by the resin sealing member, and the faces on the first direction side of the protrusions and the exposed face are disposed on the same plane. According to this structure, the cover member is positioned in the axial direction with a face on the first direction side of the protrusion as a reference and thus the stator core and the cover member can be positioned in the axial direction with a high degree of accuracy.

In the present invention, the cover member is formed with a circular ring-shaped part in a circular ring shape which is disposed on an inner side in the radial direction with respect to the cover part, and a portion on the first direction side of the resin sealing member is formed with a contact face with which an outer peripheral face of the circular ring-shaped part is contacted in the radial direction. According to this structure, the cover member can be positioned in the radial direction with respect to the resin sealing member by utilizing the outer peripheral face of the circular ring-shaped part and the contact face.

In the present invention, it is preferable that an adhesive filling space is formed in the radial direction between an outer peripheral face of the resin sealing member on the first direction side with respect to the protrusions and an inner peripheral face of the cover part on the first direction side with respect to the protrusions, and an adhesive is filled in the adhesive filling space. According to this structure, fixed strength of the cover member to the resin sealing member can be increased by the adhesive which is filled in the adhesive filling space. Further, according to this structure, entering of fluid to an inside of the motor can be restrained by the adhesive which is filled in the adhesive filling space.

In addition, in order to solve the second problem, a motor of the present invention includes a rotor having a rotation shaft and a drive magnet, a stator which is formed in a tube shape and is disposed on an outer peripheral side of the rotor, a resin sealing member made of resin, wherein one direction in an axial direction of the rotor is referred to as a first direction and a direction opposite to the first direction is referred to as a second direction, and the resin sealing member at least covers a side in the second direction of the stator and the outer peripheral side of the stator, and a cover member which is fixed to an end side in the first direction of the resin sealing member and supports the rotation shaft, in which in the resin sealing member, a first opposite face facing the cover member is formed over an entire area of the rotor in a circumferential direction, in the cover member, a second opposite face facing the first opposite face is formed over the entire area in the circumferential direction, and an intrusion restrain member is disposed between the first opposite face and the second opposite face to restrain entering of fluid to the inner peripheral side of the stator.

In the motor of the present invention, the resin sealing member covering at least a second direction side of the stator and an outer peripheral side of the stator, the first opposite face facing the cover member is formed over the entire area in the circumferential direction of the rotor and the cover member fixed to the first direction end side of the resin sealing member includes the second opposite face facing the first opposite face formed on the entire area in the circumferential direction of the rotor. Further, in the present invention, the intrusion restrain member is disposed between the first opposite face and the second opposite face to restrain entering of the fluid to the inner peripheral side of the stator. Therefore, in the present invention, it is possible to restrain entering of the fluid to the inner peripheral side of the stator.

In the present invention, for example, the second opposite face is disposed on the first direction side of the first opposite face, and the first opposite face faces the second opposite face in the axial direction. In addition, in the present invention, a portion on a side in the second direction of the cover member is formed to be a cover part in a tube shape which covers the resin sealing member from an outer peripheral side, at least a part of the inner peripheral side of the cover part is formed to be the second opposite face, at least a part of the outer peripheral side of the resin sealing member is formed to be a first opposite face, and the first opposite face may face the second opposite face in a radial direction of the rotor.

In addition, in the present invention, a portion on a side in the second direction of the cover member is formed to be the cover part in a tube shape which covers the resin sealing member from an outer peripheral side, a part of the second opposite face is disposed on a side of a first direction of a part of the first opposite face, at least a part of the inner peripheral face of the covering part is formed to be another portion of the second opposite face, at least a part of the outer peripheral face of the resin sealing member is formed to be another part of the first opposite face, and the first opposite face may face the second opposite face in the axial direction and in the radial direction of the rotor.

In the present invention, for example, the resin sealing member is formed with a first contact face that contacts the cover member in the axial direction, the cover member is formed with a second contact face that contacts the first contact face, the first opposite face and the second opposite face are disposed on a side in the first direction with respect to the first contact face and the second contact face, and a space in which the intrusion restrain member is disposed is formed between the first opposite face and the second opposite face.

In the present invention, the intrusion restrain member may be an adhesive. According to this structure, fixed strength of the cover member to the resin sealing member can be increased by the adhesive disposed between the first opposite face and the second opposite face. In addition, for example, in a case where the intrusion restrain member disposed between the first opposite face and the second opposite is a seal member such as an O-ring, since when fixing the cover member to the resin sealing member, there is a possibility that the intrusion restrain member (seal member) may be twisted, it is necessary to fix the cover member to the resin sealing member so that twisting does not occur in the intrusion restrain member. Fixing operation of the cover member to the resin sealing member becomes complicated. On the other hand, in a case the intrusion restrain member is an adhesive, the intrusion restrain member may not be twisted when the cover member is fixed to the resin sealing member, thereby the fixing operation of the cover member to the resin sealing member may become easy.

In the present invention, the intrusion restrain member may be a semi-solid composition having no adhesiveness. For example, the intrusion restrain member may be a grease which is a semi-solid lubricant. As described above, for example, in the case where the intrusion restrain member is a sealing member such as an O-ring, a twist occurs in the intrusion restrain member (sealing member), and fixing operation of the cover member to the resin sealing member becomes complicated. However, if the intrusion restrain member is a semi-solid composition, since the intrusion restrain member is not twisted when the cover member is fixed to the resin sealing member, the cover member can be easily fixed to the resin sealing member.

In the present invention, the intrusion restrain member may be a sealing member formed of an elastic member and formed in an annular shape.

In the present invention, for example, the outer peripheral face of the resin sealing member includes a large diameter outer peripheral face, which is a second direction side portion of the outer peripheral face of the resin sealing member and a small diameter outer peripheral face, which is a first direction side portion of the outer peripheral face of the resin sealing member and has the smaller outer diameter than the large diameter outer peripheral face, a boundary portion between the large diameter outer peripheral face and the small diameter outer peripheral face is formed with a first contact face orthogonal to the axial direction and in contact with the cover member in the axial direction, a portion on a side in the second direction of the cover member is formed to be a cover part in a tube shape which covers the resin sealing member from an outer peripheral side, the inner peripheral face of the cover part includes a large diameter inner peripheral face, which is a second direction side portion of the inner peripheral face of the cover part and a small diameter inner peripheral face, which is a first direction side portion of the inner peripheral face of the cover part and has the smaller inner diameter than the large diameter outer peripheral face, a boundary portion between the large diameter inner peripheral face and the small diameter inner peripheral face is formed with the second contact face orthogonal to the axial direction and in contact with the first contact face, the small diameter outer peripheral face is formed to be the first opposite face, the small diameter inner peripheral face is formed to be the second opposite face, and the arrangement space in which the intrusion restrain member is disposed is formed between the first opposite face and the second opposite face.

Advantageous Effects of Invention

As described above, in the present invention, in a motor which includes a resin sealing member which covers the stator and a cover member which supports a rotation shaft that is a part of the rotor and is fixed to the resin sealing member, a cost of the motor can be reduced. In addition, in a motor which includes a resin sealing member which covers the stator, entry of the fluid into an inner peripheral face of the stator can be restrained.

DESCRIPTION OF EMBODIMENTS

Embodiments of the disclosure will be described below with reference to the accompanying drawings.

(Schematic Structure of Pump Device)

Figure 1:
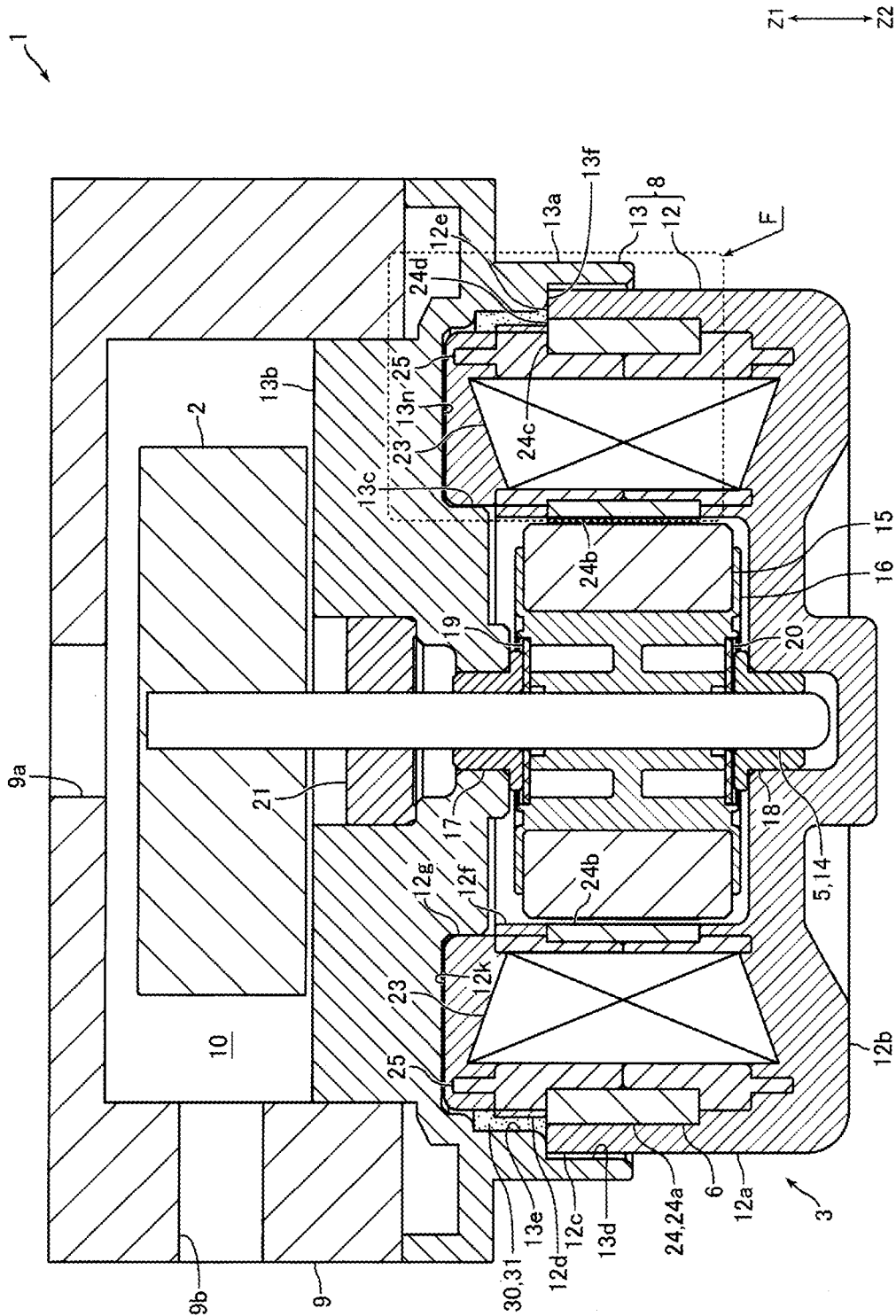
FIG. 1 is a cross-sectional view showing a pump device in which a motor in accordance with an embodiment of the disclosure is assembled.
Figure 2:
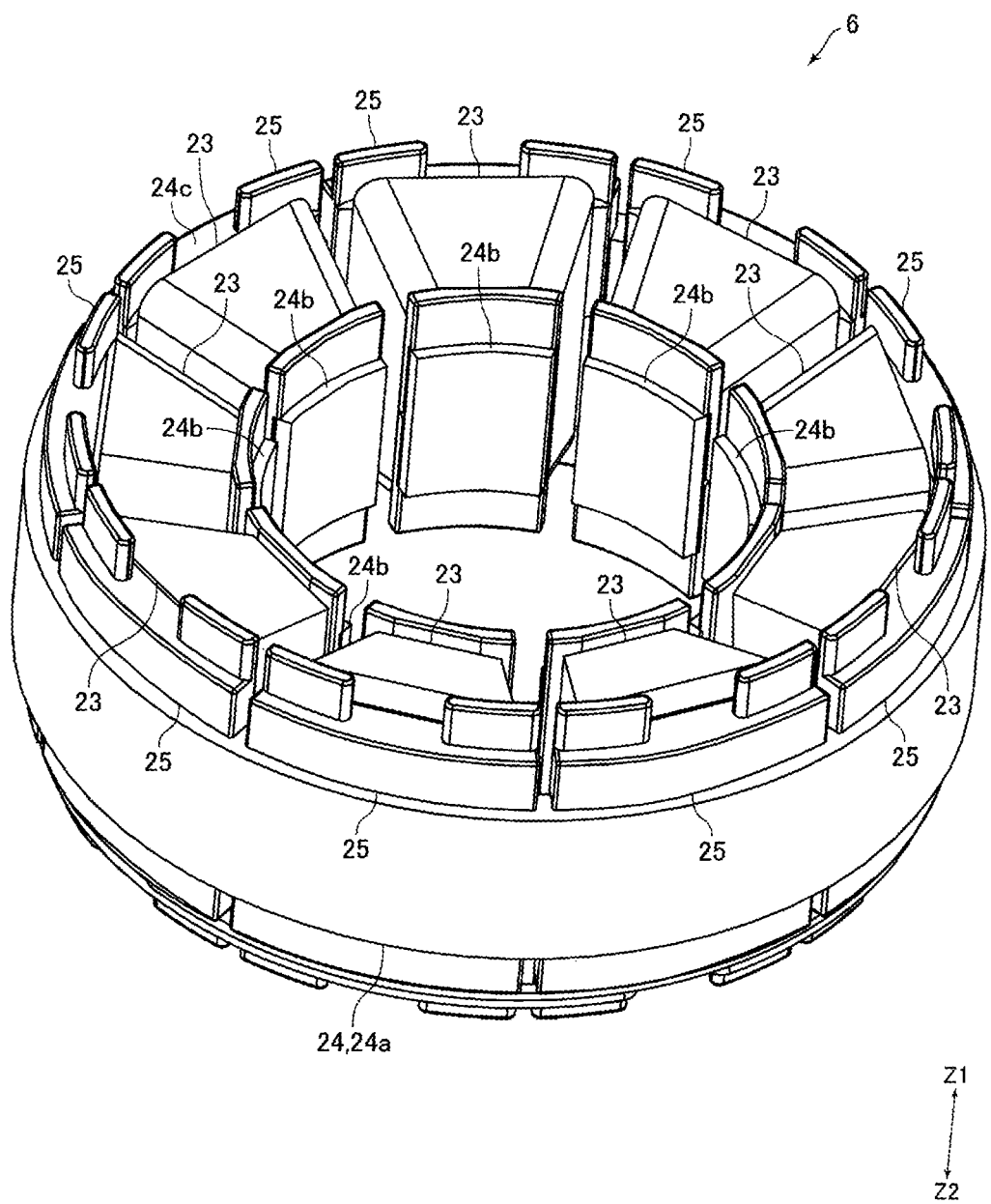
FIG. 2 is a perspective view showing a stator shown in FIG. 1.

FIG. 1 is a cross-sectional view showing a pump device 1 in which a motor 3 in accordance with an embodiment of the disclosure is assembled. FIG. 2 is a perspective view showing a stator 6 shown in FIG. 1. In the following descriptions, the "Z1" direction side in FIG. 1 and the like is referred to as an "upper" side, and the "Z2" direction side in FIG. 1 and the like which is an opposite side is referred to as a "lower" side.

A motor 3 in this embodiment is assembled to a pump device 1 and is used. The pump device 1 includes an impeller 2 which is rotated by power of the motor 3. The motor 3 is a DC brushless motor which includes a rotor 5 and a stator 6. The rotor 5 is disposed so that an axial direction of the rotor 5 and an upper and lower direction are coincided with each other. In other words, the upper and lower direction is an axial direction of the rotor 5. An upper direction ("Z1" direction) in this embodiment is a first direction which is one side in the axial direction of the rotor 5, and a lower direction ("Z2" direction) is a second direction which is the other side in the axial direction of the rotor 5. In the following descriptions, a radial direction of the rotor 5 is referred to as a "radial direction" and a peripheral direction (circumferential direction) of the rotor 5 is referred to as a "circumferential direction".

An impeller 2, a rotor 5 and a stator 6 are disposed in an inside of a pump case which is structured of a housing 8 structuring a part of the motor 3 and a case body 9 which is fixed to an upper end part of the housing 8. The case body 9 is formed with an inlet port 9a for fluid and an outlet port 9b for the fluid. A region surrounded by the housing 8 and the case body 9 is structured to be a pump chamber 10 where fluid sucked from the inlet port 9a is passed toward the outlet port 9b. A sealing member (not shown) for securing airtightness of the pump chamber 10 is disposed in a joined portion of the housing 8 to the case body 9. The housing 8 includes a resin sealing member 12 made of resin which covers the stator 6 and a cover member 13 which is fixed to an upper end side of the resin sealing member 12.

The rotor 5 includes a rotation shaft 14, a drive magnet 15 and a sleeve 16. The rotation shaft 14 is disposed so that an axial direction of the rotation shaft 14 and the upper and lower direction are coincided with each other. The sleeve 16 is formed in a substantially cylindrical tube shape with flanges which is provided with flange parts at both ends in the upper and lower direction. The sleeve 16 is fixed to an outer peripheral face of a lower end side portion of the rotation shaft 14. The drive magnet 15 is fixed to an outer peripheral face of the sleeve 16. Further, the drive magnet 15 is disposed between the flange parts of the sleeve 16 which are formed at both ends in the upper and lower direction. An N-pole and an S-pole are alternately magnetized in the circumferential direction on an outer peripheral face of the drive magnet 15.

The impeller 2 is fixed to an upper end part of the rotation shaft 14. The impeller 2 is disposed in an inside of the pump chamber 10. The rotation shaft 14 is rotatably supported by two bearings 17 and 18 which are disposed so that the sleeve 16 is sandwiched therebetween in the upper and lower direction. The bearings 17 and 18 are slide bearings which are formed in a cylindrical tube shape with a flange. The bearing 17 disposed on an upper side to the sleeve 16 is fixed to the cover member 13, and the bearing 18 disposed on a lower side to the sleeve 16 is fixed to the resin sealing member 12. In other words, the rotation shaft 14 is rotatably supported by the cover member 13 through the bearing 17 and is rotatably supported by the resin sealing member 12 through the bearing 18.

The bearing 17 is fixed to the cover member 13 in a state that the flange part of the bearing 17 is disposed on a lower side and the bearing 18 is fixed to the resin sealing member 12 in a state that the flange part of the bearing 18 is disposed on an upper side. A circular ring-shaped bearing plate 19 which is capable of contacting with the flange part of the bearing 17 is fixed to an upper end side of the sleeve 16. A circular ring-shaped bearing plate 20 which is capable of contacting with the flange part of the bearing 18 is fixed to a lower end side of the sleeve 16. A slight gap space is formed in at least either between the flange part of the bearing 17 and the bearing plate 19 or between the flange part of the bearing 18 and the bearing plate 20 in the upper and lower direction.

In this embodiment, the bearings 17 and 18 function as radial bearings for the rotor 5, and the bearings 17 and 18 and the bearing plates 19 and 20 function as thrust bearings for the rotor 5. Further, a circular ring-shaped sealing member 21 is disposed to an upper side of the bearing 17. The sealing member 21 is fixed to the cover member 13. An inner peripheral face of the sealing member 21 is contacted with an outer peripheral face of the rotation shaft 14.

The stator 6 is formed in a tube shape as a whole. Specifically, the stator 6 is formed in a substantially cylindrical tube shape. The stator 6 is disposed so that an axial direction of the stator 6 and the upper and lower direction are coincided with each other. Further, the stator 6 is disposed on an outer peripheral side to the rotor 5. The stator 6 includes a plurality of drive coils 23, a stator core 24 and a plurality of insulators 25.

The stator core 24 is a laminated core which is structured so that thin magnetic plates made of magnetic material are laminated. The stator core 24 is provided with an outer peripheral ring part 24a formed in a ring shape and a plurality of salient pole parts 24b which protrude to an inner side in the radial direction from the outer peripheral ring part 24a. The outer peripheral ring part 24a is formed in a circular ring shape. An outer peripheral face of the outer peripheral ring part 24a structures an outer peripheral face of the stator core 24. Further, when viewed in the upper and lower direction, the outer peripheral face of the outer peripheral ring part 24a is an outer peripheral face of the stator 6. An upper end face 24c of the outer peripheral ring part 24a is formed to be a flat face perpendicular to the upper and lower direction. A lower end face of the outer peripheral ring part 24a is also formed to be a flat face perpendicular to the upper and lower direction.

The plurality of the salient pole parts 24b is formed at equal angular pitches and is disposed at a constant pitch in the circumferential direction. A tip end part (inner side end part in the radial direction) of the salient pole part 24b is formed in a substantially circular arc shape which is extended to both sides in the circumferential direction. The tip end face of the salient pole part 24b faces the outer peripheral face of the drive magnet 15.

The insulator 25 is formed of insulating material such as resin. The insulator 25 is attached to each of the salient pole parts 24b. Further, the insulator 25 is formed in a tube shape with flanges whose both ends are provided with a flange part, and the insulator 25 is attached to the salient pole part 24b so that an axial direction of the insulator 25 formed in a tube shape and the radial direction of the stator 6 are coincided with each other. The drive coil 23 is wound around the salient pole part 24b through the insulator 25. In other words, each of the drive coils 23 is wound around each of the salient pole parts 24b through the insulator 25.

The insulator 25 covers a part of the upper end face 24c of the outer peripheral ring part 24a from an upper side. Specifically, portions of the upper end face 24c between the insulators 25 in the circumferential direction and an outer side portion in the radial direction of the upper end face 24c are not covered by the insulators 25. However, other portions of the upper end face 24c are covered by the insulators 25. Similarly, portions of a lower end face of the outer peripheral ring part 24a between the insulators 25 in the circumferential direction and an outer side portion in the radial direction of the lower end face of the outer peripheral ring part 24a are not covered by the insulators 25. However, other portions of the lower end face of the outer peripheral ring part 24a are covered by the insulators 25.

(Structure of Resin Sealing Member and Cover Member)

Figure 3:
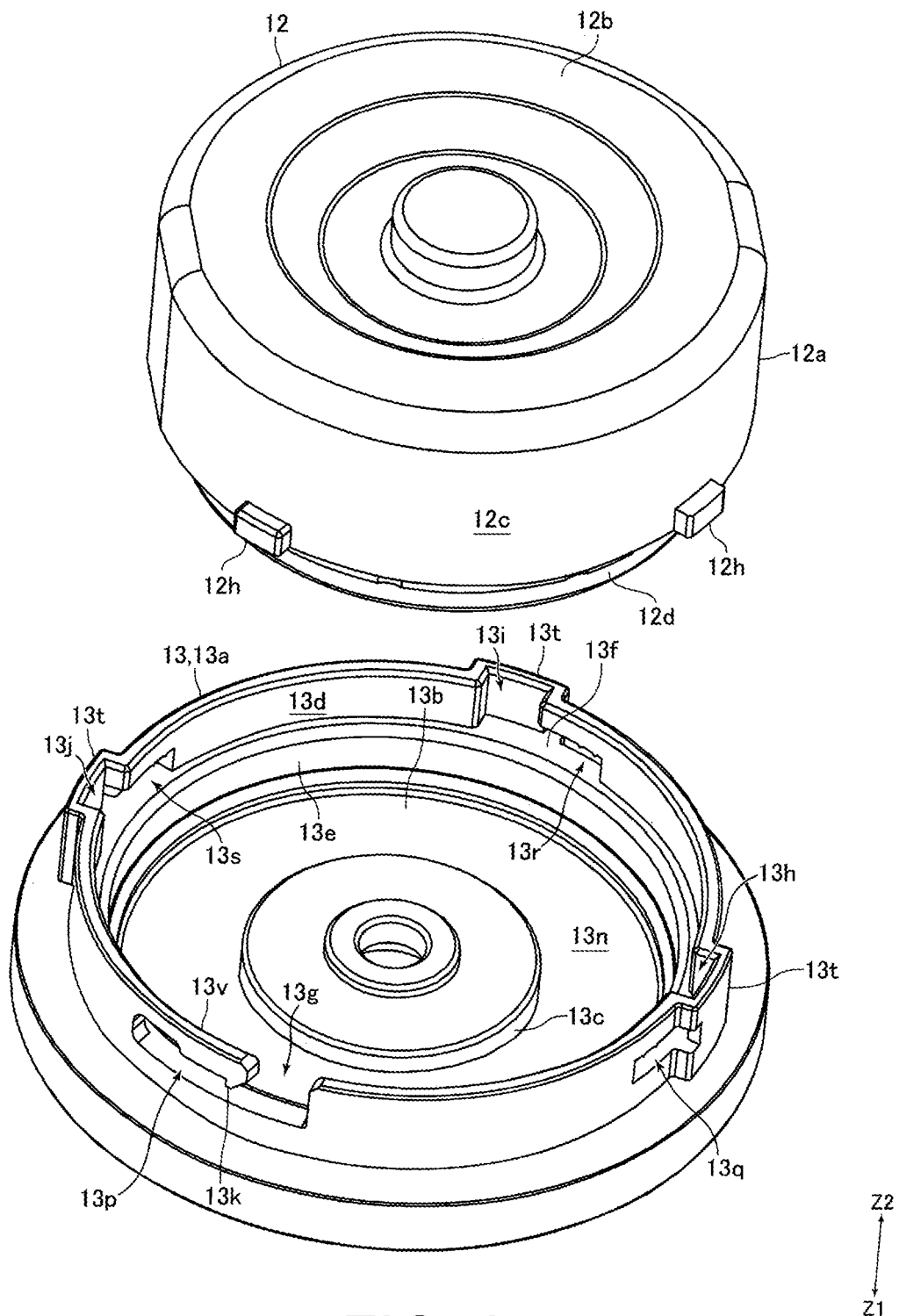
FIG. 3 is an exploded perspective view showing a stator with a resin sealing member and a cover member shown in FIG. 1.
Figure 4:
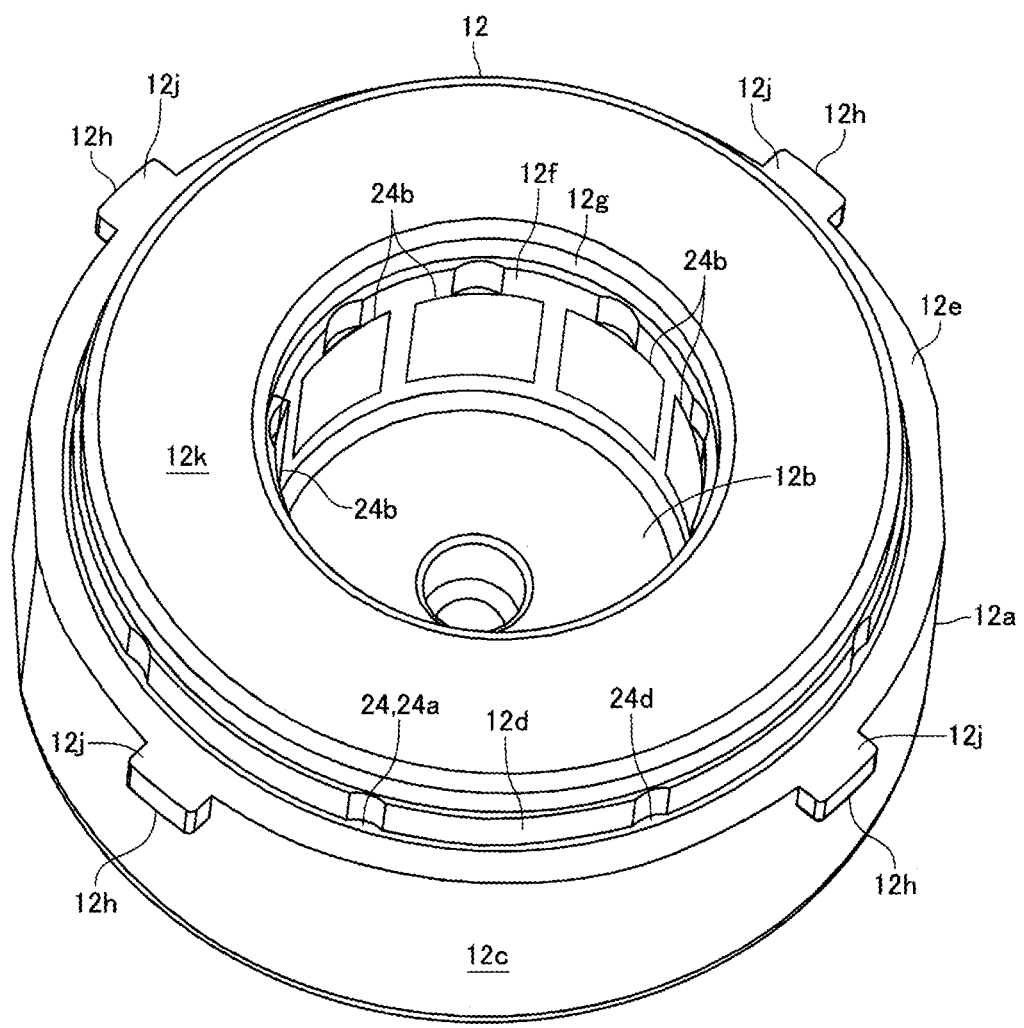
FIG. 4 is a perspective view showing the stator with a resin sealing member shown in FIG. 3 which is viewed from an opposite side.
Figure 5A:
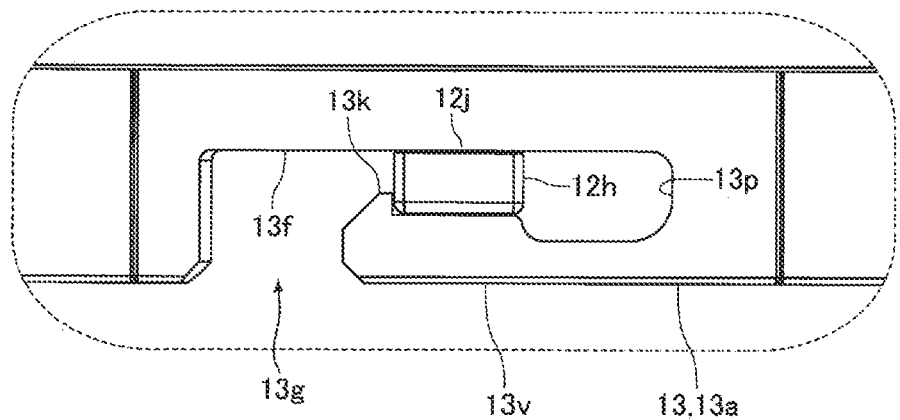
FIG. 5(A) is a side view showing an engaging state of a first engagement groove with a protrusion shown in FIG. 3.
Figure 5B:
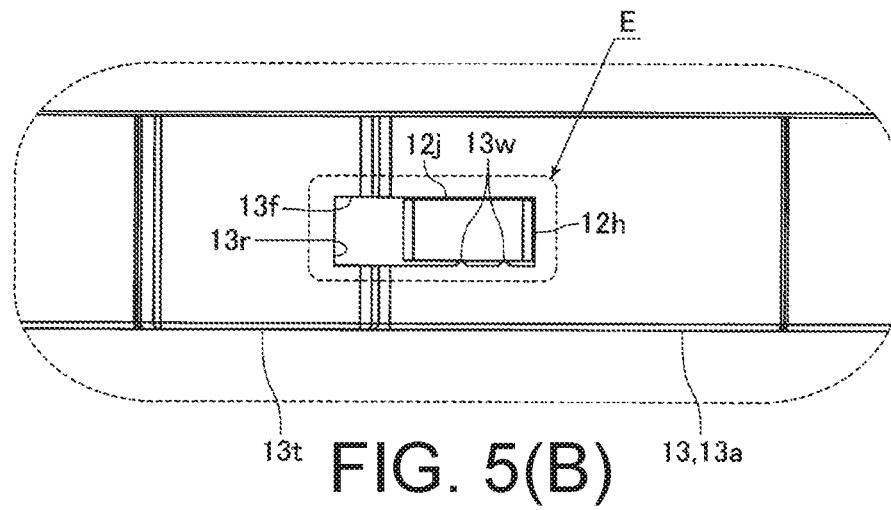
FIG. 5(B) is a side view showing an engaging state of a third engagement groove with a protrusion shown in FIG. 3.
Figure 5C:
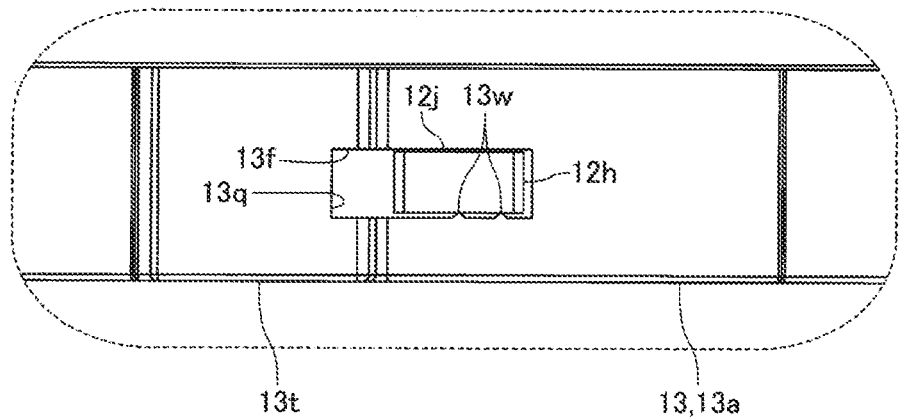
FIG. 5(C) is a side view showing an engaging state of a second engagement groove with a protrusion shown in FIG. 3.
Figure 6:
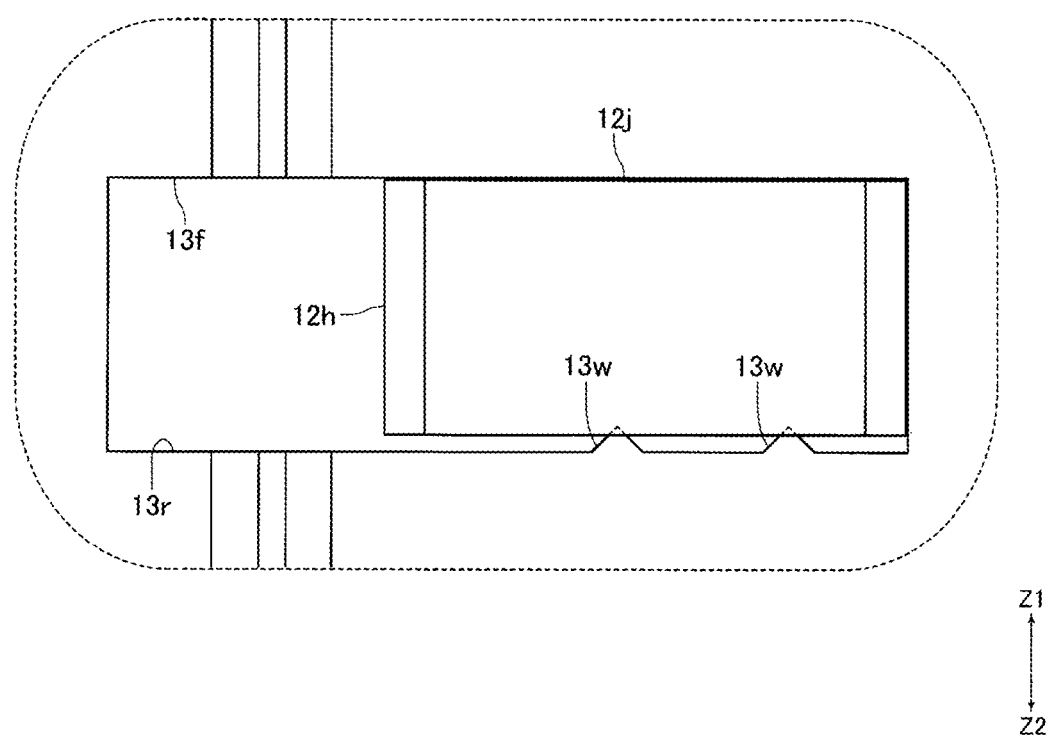
FIG. 6 is an enlarged view showing the "E" part in FIG. 5(B).

FIG. 3 is an exploded perspective view showing the stator 6 with the resin sealing member 12 and the cover member 13 shown in FIG. 1. In FIG. 3, the resin sealing member 12 and the cover member 13 in FIG. 1 are shown upside down, in other words, the "Z2" direction side which is a lower side is set on an upper side. FIG. 4 is a perspective view showing the stator 6 with the resin sealing member 12 shown in FIG. 3 which is viewed from an opposite side. FIG. 5(A) is a side view showing an engaging state of an engagement groove 13p with a protrusion 12h shown in FIG. 3, FIG. 5(B) is a side view showing an engaging state of an engagement groove 13r with a protrusion 12h shown in FIG. 3, and FIG. 5(C) is a side view showing an engaging state of an engagement groove 13q with a protrusion 12h shown in FIG. 3. FIG. 6 is an enlarged view showing the "E" part in FIG. 5(B).

The resin sealing member 12 is provided for completely covering the drive coils 23 and protecting the drive coils 23 from fluid. The resin sealing member 12 is structured of a tube section 12a formed in a substantially cylindrical tube shape and a bottom part 12b formed in a substantially circular plate shape, and the resin sealing member 12 is formed in a substantially bottomed cylindrical tube shape as a whole. The tube section 12a is disposed so that an axial direction of the tube section 12a and the upper and lower direction are coincided with each other. When viewed in the upper and lower direction, the center of the tube section 12a and the center of the stator 6 are coincided with each other. The bottom part 12b closes a lower end of the tube section 12a. The bearing 18 is fixed to the center on an upper face side of the bottom part 12b.

The resin sealing member 12 is formed of BMC (Bulk Molding Compound). In this embodiment, the stator 6 is disposed in a die and resin material is injected into the die and cured to form the resin sealing member 12. In other words, the resin sealing member 12 is integrally molded with the stator 6. A part of the upper end face 24c of the outer peripheral ring part 24a of the stator core 24 and the tip end faces (inner side faces in the radial direction) of the salient pole parts 24b are not covered by the resin sealing member 12. However, other portions of the stator 6 are covered by the resin sealing member 12. In other words, a lower side and an outer peripheral side of the stator 6 are covered by the resin sealing member 12. In addition, an upper side of the stator 6 excluding a part of the upper end face 24c of the outer peripheral ring part 24a is also covered by the resin sealing member 12.

The tube section 12a is formed in a substantially cylindrical tube shape with a thick wall thickness. An outer diameter on an upper end side of an outer peripheral face of the tube section 12a is set to be smaller than an outer diameter on a lower end side of an outer peripheral face of the tube section 12a. In other words, the outer peripheral face of the tube section 12a (that is, the outer peripheral face of the resin sealing member 12) is structured of a large diameter outer peripheral face 12c, which is a lower side portion of the outer peripheral face of the tube section 12a (that is, the lower side portion of the outer peripheral face of the resin sealing member 12), and a small diameter outer peripheral face 12d which is an upper side portion of the outer peripheral face of the tube section 12a (that is, the upper side portion of the outer peripheral face of the resin sealing member 12) and has the smaller outer diameter than the large diameter outer peripheral face 12c. An outer diameter of the large diameter outer peripheral face 12c is set to be larger than an outer diameter of the small diameter outer peripheral face 12d. The outer diameter of the small diameter outer peripheral face 12d is smaller than the outer diameter of the outer peripheral ring part 24a, and the outer diameter of the large diameter outer peripheral face 12c is larger than the outer diameter of the outer peripheral ring part 24a. A boundary portion between the large diameter outer peripheral face 12c and the small diameter outer peripheral face 12d is formed with a step face 12e in a flat face shape which is perpendicular to the upper and lower direction.

An inner diameter on an upper end side of an inner peripheral face of the tube section 12a is set to be larger than an inner diameter on a lower end side of the inner peripheral face of the tube section 12a. In other words, the inner peripheral face of the tube section 12a is structured of a small diameter inner peripheral face 12f, which is a lower side portion of the inner peripheral face of the tube section 12a, and a large diameter inner peripheral face 12g which is an upper side portion of the inner peripheral face of the tube section 12a. The inner diameter of the small diameter inner peripheral face 12f is set to be smaller than the inner diameter of the large diameter inner peripheral face 12g. Further, a curvature radius of the small diameter inner peripheral face 12f is set to be substantially equal to a curvature radius of the tip end face of the salient pole part 24b.

The tube section 12a is formed with a plurality of protrusions 12h which protrude to an outer side in the radial direction from the outer peripheral face of the tube section 12a. In other words, the resin sealing member 12 is formed with a plurality of the protrusions 12h which protrude toward the outer side in the radial direction from the outer peripheral face of the resin sealing member 12 and are structured to fix the cover member 13 to the resin sealing member 12. In this embodiment, four protrusions 12h are formed on the tube section 12a. The four protrusions 12h are formed at a predetermined pitch in the circumferential direction. Specifically, the four protrusions 12h are formed at a pitch of 90° with an axial center of the stator 6 as a center and are disposed at an equal interval in the circumferential direction.

A shape of the protrusion 12h when viewed in the upper and lower direction is a substantially rectangular shape. An upper face 12j of the protrusion 12h is formed to be a flat face perpendicular to the upper and lower direction. Further, the protrusion 12h is formed at an upper end of the large diameter outer peripheral face 12c. The upper face 12j is connected with the step face 12e, and the upper face 12j and the step face 12e are disposed on the same plane. An under face of the protrusion 12h is also formed to be a flat face perpendicular to the upper and lower direction.

As described above, a part of the upper end face 24c of the outer peripheral ring part 24a is not covered by the resin sealing member 12. In other words, a part of the upper end face 24c is an exposed face 24d which is not covered by the resin sealing member 12 (see FIG. 1 and FIG. 4). Specifically, an outer side portion in the radial direction of the upper end face 24c is the exposed face 24d. In this embodiment, the exposed face 24d, the step face 12e and the upper faces 12j are disposed on the same plane.

The cover member 13 is a resin component separately formed from the resin sealing member 12 and is, for example, formed of polypropylene. The cover member 13 is structured of a tube section 13a formed in a substantially cylindrical tube shape and a bottom part 13b formed in a substantially circular plate shape, and the cover member 13 is formed in a substantially bottomed cylindrical tube shape as a whole. The tube section 13a is disposed so that an axial direction of the tube section 13a and the upper and lower direction are coincided with each other. When viewed in the upper and lower direction, the center of the tube section 13a and the center of the stator 6 are coincided with each other. The bottom part 13b closes an upper end of the tube section 13a.

A through hole is formed at the center of the bottom part 13b. The bearing 17 and the sealing member 21 are fixed to the through hole. Further, a circular ring-shaped part 13c formed in a circular ring shape which is protruded to a lower side is formed at the center of the bottom part 13b. In other words, the cover member 13 is formed with a circular ring-shaped part 13c which is disposed on an inner side in the radial direction with respect to the tube section 13a. When viewed in the upper and lower direction, the center of the circular ring-shaped part 13c is coincided with the center of stator 6.

An inner diameter on an upper end side of an inner peripheral face of the tube section 13a is set to be smaller than an inner diameter on a lower end side of the inner peripheral face of the tube section 13a. In other words, the inner peripheral face of the tube section 13a is structured of a large diameter inner peripheral face 13d, which is a lower side portion of the inner peripheral face of the tube section 13a, and a small diameter inner peripheral face 13e, which is an upper side portion of the inner peripheral face of the tube section 13a and is smaller in inner diameter than the large diameter inner peripheral face 13d. An inner diameter of the large diameter inner peripheral face 13d is larger than the outer diameter of the large diameter outer peripheral face 12c of the resin sealing member 12. The inner diameter of the small diameter inner peripheral face 13e is larger than the outer diameter of the small diameter outer peripheral face 12d.

A planar step face 13f perpendicular to the vertical direction is formed at the boundary portion between the large diameter inner peripheral face 13d and the small diameter inner peripheral face 13e. The step face 13f is in contact with the step face 12e. The step face 12e of the present embodiment is a first contact face that contacts the cover member 13 in the vertical direction. The step face 13f is a second contact face that contacts the step face 12e, which is the first contact face.

The tube section 13a covers the resin sealing member 12 from an outer peripheral side. In other words, the tube section 13a covers the resin sealing member 12 from an outer side in the radial direction. Specifically, the tube section 13a covers an upper end side portion of the resin sealing member 12 from an outer side in the radial direction. More specifically, a portion of the tube section 13a where the large diameter inner peripheral face 13d is formed covers an upper end side of a portion of the tube section 12a where the large diameter outer peripheral face 12c is formed, and a portion of the tube section 13a where the small diameter inner peripheral face 13e is formed covers a portion of the tube section 12a where the small diameter outer peripheral face 12d is formed. The tube section 13a in this embodiment is a cover part in a tube shape which covers the resin sealing member 12 from an outer peripheral side. In other words, in this embodiment, the lower side portion of the cover member 13 is the cover part which covers the resin sealing member 12 from an outer peripheral side.

As described above, the portion of the tube section 13a where the small diameter inner peripheral face 13e is formed covers the portion of the tube section 12a where the small diameter outer peripheral face 12d is formed from the outside in the radial direction and the small diameter outer peripheral face 12d and the small diameter inner peripheral face 13e are opposed in the radial direction. The small diameter outer peripheral face 12d of the present embodiment is a first opposite face facing the cover member 13, and the small diameter inner peripheral face 13e is a second opposite face facing the small diameter outer peripheral face 12d which is the first opposite face. That is, in the resin sealing member 12, the small diameter outer peripheral face 12d, which is the first opposite face, is formed over the entire area in the circumferential direction, and in the cover member 13, the small diameter inner peripheral face 13e, which is the second opposite face, is formed over the entire area in the circumferential direction. Further, in the present embodiment, the small diameter outer peripheral face 12d, which is a part of the outer peripheral face of the resin sealing member 12, is the first opposite face, and the small diameter inner peripheral face 13e, which is a part of the inner peripheral face of the tube section 13a, is the second opposite face. The small diameter outer peripheral face 12d, which is the first opposite face, and the small diameter inner peripheral face 13e, which is the second opposite face, are disposed above the step faces 12e and 13f.

As described above, the step face 13f abuts the step face 12e. In addition, as described above, the inner diameter of the small diameter inner peripheral face 13e is larger than the outer diameter of the small diameter outer peripheral face 12d. As shown in FIG. 1, an adhesive filling space 30 is formed between the small diameter outer peripheral face 12d and the small diameter inner peripheral face 13e in the radial direction, and an adhesive 31 is filled in the adhesive filling space 30. In other words, the adhesive filling space 30 in which the adhesive 31 is filled is formed between the small diameter outer peripheral face 12d of the resin sealing member 12, which is an outer peripheral face above the protrusions 12h, and the small diameter inner peripheral face 13e of the tube section 13a, which is an inner peripheral face above the protrusions 12h, in the radial direction.

The adhesive 31 is an epoxy resin adhesive. The adhesive 31 serves to fix the resin sealing member 12 and the cover member 13 in an auxiliary manner. The adhesive 31 also functions to restrain the entry of a liquid (fluid) such as water into the inner peripheral side of the stator 6 through the gap in the radial direction between the large diameter inner peripheral face 13d and the large diameter outer peripheral face 12c. That is, the adhesive 31 is disposed between the small diameter outer peripheral face 12d and the small diameter inner peripheral face 13e as an intrusion restraint member for restraining the entry of a fluid into the inner peripheral side of the stator 6. Specifically, the adhesive 31 is disposed between the small diameter outer peripheral face 12d and the small diameter inner peripheral face 13e over the entire area in the circumferential direction. Further, the adhesive filling space 30 is formed between the small diameter outer peripheral face 12d and the small diameter inner peripheral face 13e as an arrangement space in which the adhesive 31 is disposed.

As shown in FIG. 3, the tube section 13a is formed with a plurality of notch sections 13g, 13h, 13i and 13j, which are cut out toward an upper direction from a lower end of the tube section 13a, and a plurality of engagement grooves 13p, 13q, 13r and 13s which are respectively engaged with the plurality of the protrusions 12h. Each of the engagement grooves 13p to 13s is extended from each of upper end sides of the notch sections 13g to 13j to one side in the circumferential direction (clockwise direction in FIG. 3). In the following descriptions, one side in the circumferential direction (clockwise direction in FIG. 3) is referred to as a "clockwise direction", and the other side in the circumferential direction (counterclockwise direction in FIG. 3) is referred to as a "counterclockwise direction".

In this embodiment, the four notch sections 13g to 13j and the four engagement grooves 13p to 13s are respectively formed in the tube section 13a so as to be connected with each other. The four notch sections 13g to 13j and the four engagement grooves 13p to 13s are formed at the same pitch as the four protrusions 12h in the circumferential direction. In other words, the four notch sections 13g to 13j and the four engagement grooves 13p to 13s are formed at a pitch of 90° with the axial center of the stator 6 as a center.

The engagement groove 13p is connected with the notch section 13g. The engagement groove 13q is connected with the notch section 13h. The engagement groove 13r is connected with the notch section 13i. The engagement groove 13s is connected with the notch section 13j. The engagement grooves 13p to 13s are disposed in this order in the circumferential direction. The engagement groove 13p in this embodiment is a first engagement groove, and the engagement grooves 13q and 13s are second engagement grooves which are adjacent in the circumferential direction to the engagement groove 13p which is the first engagement groove. Further, the engagement groove 13r is a third engagement groove which is a remaining engagement groove except the engagement groove 13p which is the first engagement groove and the engagement grooves 13q and 13s which are the second engagement grooves of the four engagement grooves 13p to 13s.

Further, the tube section 13a is formed with a stopper 13k which restricts movement of the cover member 13 to the counterclockwise direction in a state that the protrusions 12h are engaged with the engagement grooves 13p to 13s. Further, the tube section 13a is formed with a plurality of connected parts 13t by each of which both ends in the upper and lower direction of each of the engagement grooves 13q to 13s are connected with each other on the counterclockwise direction side of each of the engagement grooves 13q to 13s. In other words, the tube section 13a is formed with three connected parts 13t.

The notch sections 13g to 13j are formed over a range from a lower end of the tube section 13a to the step face 13f so that the protrusions 12h are capable of being fitted from a lower side to the positions of the engagement grooves 13p to 13s. In other words, the notch sections 13g to 13j are formed in a portion where the large diameter inner peripheral face 13d of the tube section 13a is formed. Widths in the circumferential direction of the notch sections 13g to 13j are set to be wider than a width of the protrusion 12h in the circumferential direction. Specifically, the widths in the circumferential direction of the notch sections 13g to 13j are set to be slightly wider than the width of the protrusion 12h in the circumferential direction.

The engagement grooves 13p to 13s are formed in slit shapes extended from the notch sections 13g to 13j in the circumferential direction. Upper side faces of the engagement grooves 13p to 13s are formed to be flat faces perpendicular to the upper and lower direction. The upper side faces of the engagement grooves 13p to 13s are connected with the step face 13f, and the upper side faces of the engagement grooves 13p to 13s and the step face 13f are disposed on the same plane.

Each of the three connected parts 13t connects both ends in the circumferential direction of each of the notch sections 13h to 13j. Further, each of the three connected parts 13t covers each of the notch sections 13h to 13j from an outer side in the radial direction, and strength of the tube section 13a in the notch sections 13h to 13j can be secured. The connected parts 13t are formed so as to protrude from the outer peripheral face of the tube section 13a to an outer side in the radial direction for securing spaces of the notch sections 13h to 13j. Further, the connected part 13t is formed over the entire region of the tube section 13a in the upper and lower direction. On the other hand, both ends in the upper and lower direction of the engagement groove 13p are not connected with each other on the counterclockwise direction side of the engagement groove 13p, and a lower side of the engagement groove 13p is formed to be an elastic piece 13v which is capable of being elastically deformed with its clockwise direction end as a supporting point.

A width in the upper and lower direction of a portion on a clockwise direction side of the elastic piece 13v is narrower than a width in the upper and lower direction of a portion on a counterclockwise direction side of the elastic piece 13v. In other words, a width in the upper and lower direction of a portion on the counterclockwise direction side of the engagement groove 13p is narrower than a width in the upper and lower direction of a portion on the clockwise direction side of the engagement groove 13p. A lower side face of the engagement groove 13p (upper end face of the elastic piece 13v) is formed to be a flat face perpendicular to the upper and lower direction. The width in the upper and lower direction of the portion on the counterclockwise direction side of the engagement groove 13p is set to be substantially equal to a thickness in the upper and lower direction of the protrusion 12h so that the protrusion 12h is capable of being elastically held in the upper and lower direction.

The stopper 13k is formed on an end side in the counterclockwise direction of the engagement groove 13p. Specifically, the stopper 13k is formed on the end side in the counterclockwise direction of the lower side face of the engagement groove 13p. In other words, the stopper 13k is formed on an end side in the counterclockwise direction of an upper end face of the elastic piece 13v. The stopper 13k is formed as a hook part formed in a hook shape with which an end face on the counterclockwise direction side of the protrusion 12h engaged with the engagement groove 13p is contacted.

A lower side face of each of the engagement grooves 13q to 13s is formed to be a flat face perpendicular to the upper and lower direction. A width of each of the engagement grooves 13q to 13s in the upper and lower direction is slightly larger than a thickness in the upper and lower direction of the protrusion 12h. A lower side face of each of the engagement grooves 13q to 13s is formed with protruded parts 13w protruded to an upper side for positioning the protrusion 12h in the axial direction. In this embodiment, two protruded parts 13w are formed on each of lower side faces of the engagement grooves 13q to 13s with a predetermined space therebetween in the circumferential direction. In a state that the respective protrusions 12h are engaged with the engagement grooves 13q to 13s, tip ends of the protruded parts 13w are crushed by the protrusions 12h and the shape of the protruded part 13w when viewed in the radial direction is formed to be a substantially isosceles trapezoid shape.

After the cover member 13 is assembled to the resin sealing member 12 from an upper side toward a lower direction so that the respective four protrusions 12h are passed through the respective four notch sections 13g to 13j, the cover member 13 is turned in the counterclockwise direction with respect to the resin sealing member 12 and fixed to the resin sealing member 12. In a state where the cover member 13 is fixed to the resin sealing member 12, the respective four protrusions 12h are engaged with the respective engagement grooves 13p to 13s.

In a state that the cover member 13 is fixed to the resin sealing member 12, as shown in FIG. 5(A), an end face on the counterclockwise direction side of the protrusion 12h is abutted with an end face on the clockwise direction side of the stopper 13k in the engagement groove 13p, and a space is formed between an end face on the clockwise direction side of the protrusion 12h and a side face on the clockwise direction side of the engagement groove 13p. Further, in the state that the cover member 13 is fixed to the resin sealing member 12, as shown in FIG. 5(B), in the engagement groove 13r, an end face on the clockwise direction side of the protrusion 12h is abutted with a side face on the clockwise direction side of the engagement groove 13r, and a space is formed between an end face on the counterclockwise direction side of the protrusion 12h and a side face on the counterclockwise direction side of the engagement groove 13r.

Further, in the state that the cover member 13 is fixed to the resin sealing member 12, as shown in FIG. 5(C), in the engagement groove 13q, a space is formed between the protrusion 12h and the engagement groove 13q on both sides of the protrusion 12h in a circumferential direction. Similarly, in the state that the cover member 13 is fixed to the resin sealing member 12, in the engagement groove 13s, a space is formed between the protrusion 12h and the engagement groove 13s on both sides of the protrusion 12h in the circumferential direction.

As described above, in this embodiment, the cover member 13 is positioned in the circumferential direction with respect to the resin sealing member 12 by utilizing the protrusion 12h engaged with the engagement groove 13p and the stopper 13k, and by utilizing the protrusion 12h engaged with the engagement groove 13r and the engagement groove 13r.

Further, in the state that the cover member 13 is fixed to the resin sealing member 12, as shown in FIG. 5(B) and FIG. 6, in the engagement groove 13r, the upper side face of the engagement groove 13r is abutted with the upper face 12j of the protrusion 12h, and the upper end faces of the protruded parts 13w are abutted with the under face of the protrusion 12h. Further, in the state that the cover member 13 is fixed to the resin sealing member 12, as shown in FIG. 5(C), also in the engagement groove 13q, the upper side face of the engagement groove 13q is abutted with the upper face 12j of the protrusion 12h, and the upper end faces of the protruded parts 13w are abutted with the under face of the protrusion 12h. Similarly, in the state that the cover member 13 is fixed to the resin sealing member 12, in the engagement groove 13s, the upper side face of the engagement groove 13s is abutted with the upper face 12j of the protrusion 12h, and the upper end faces of the protruded parts 13w are abutted with the under face of the protrusion 12h.

As described above, in this embodiment, the cover member 13 is positioned in the upper and lower direction with respect to the resin sealing member 12 by the protrusion 12h engaged with the engagement groove 13r and the engagement groove 13r, by the protrusion 12h engaged with the engagement groove 13q and the engagement groove 13q, and by the protrusion 12h engaged with the engagement groove 13s and the engagement groove 13s. Further, the upper face 12j of the protrusion 12h, which is disposed on the same plane as the step face 12e, and the step face 12e, and the upper side faces of the engagement grooves 13p to 13s which are disposed on the same plane as the step face 13f and the step face 13f are formed to be reference surfaces with respect to the resin sealing member 12 for positioning the cover member 13 in the upper and lower direction.

In this embodiment, as shown in FIG. 5(A), in the engagement groove 13p, the upper side face of the engagement groove 13p is abutted with the upper face 12j of the protrusion 12h, and the lower side face on the counterclockwise direction side of the engagement groove 13p is abutted with the under face of the protrusion 12h. However, as described above, the elastic piece 13v is capable of being elastically deformed with the clockwise direction end of the elastic piece 13v as a supporting point. Therefore, the protrusion 12h engaged with the engagement groove 13p and the engagement groove 13p do not function for positioning the cover member 13 in the upper and lower direction with respect to the resin sealing member 12.

Further, after the cover member 13 is assembled to the resin sealing member 12 and, when the cover member 13 is turned to the counterclockwise direction with respect to the resin sealing member 12, the elastic piece 13v is elastically deformed to a lower side and resiliently bent so that the protrusion 12h is passed through the stopper 13k. In other words, the elastic piece 13v is elastically deformed in the upper and lower direction and engaged with the protrusion 12h by snap fitting. Further, before the cover member 13 is fixed to the resin sealing member 12, a shape of the protruded part 13w when viewed in the radial direction is formed to be a triangular shape (see the broken line in FIG. 6). The protruded part 13w is formed as a protruded part for positioning the protrusion 12h in the axial direction. Therefore, a height in the axial direction of the protruded part 13w is set so that the upper face 12j of the protrusion 12h is capable of abutting with the upper side face of the engagement groove 13r. As a result, as described above, after the cover member 13 is assembled to the resin sealing member 12, when the cover member 13 is turned to the counterclockwise direction with respect to the resin sealing member 12, the upper end part of the protruded part 13w is crushed and the shape of the protruded part 13w is deformed in a substantially isosceles trapezoid shape when viewed in the radial direction.

As shown in FIG. 1, the outer peripheral face of the circular ring-shaped part 13c is contacted with the large diameter inner peripheral face 12g of the tube section 12a. In this embodiment, the cover member 13 is positioned in the radial direction with respect to the resin sealing member 12 by the outer peripheral face of the circular ring-shaped part 13c and the large diameter inner peripheral face 12g. The large diameter inner peripheral face 12g in this embodiment is a contact face with which the outer peripheral face of the circular ring-shaped part 13c is contacted in the radial direction and is formed in an upper side portion of the resin sealing member 12. In addition, the under face 13n of a portion of the bottom part 13b which is positioned radially outside of the circular ring-shaped part 13c and the upper end face 12k of the tube section 12a are planes orthogonal to the vertical direction. The under face 13n and the upper end face 12k are opposed in the vertical direction. Further, a gap is formed between the under face 13n and the upper end face 12k.

Principal Effects in this Embodiment

As described above, in this embodiment, the four protrusions 12h protruded to an outer side in the radial direction are formed in the resin sealing member 12, and the notch sections 13g to 13j, the engagement grooves 13p to 13s and the stopper 13k are formed in the tube section 13a of the cover member 13 which covers the resin sealing member 12 from an outer peripheral side. Further, a width in the circumferential direction of each of the notch sections 13g to 13j is set to be wider than a width in the circumferential direction of the protrusion 12h. Therefore, according to this embodiment, as described above, the cover member 13 is assembled to the resin sealing member 12 from an upper side toward a lower direction so that each of the four protrusions 12h is passed through each of the four notch sections 13g to 13j and then, the cover member 13 is turned to the counterclockwise direction. As a result, the cover member 13 is fixed to the resin sealing member 12. Therefore, in this embodiment, screws for fixing the cover member 13 to the resin sealing member 12 are not required.

Further, in this embodiment, the protrusion 12h formed in the resin sealing member 12 is protruded from an outer peripheral face of the resin sealing member 12. Therefore, even when the resin sealing member 12 is formed of BMC, the protrusion 12h can be easily formed in a molding step of the resin sealing member 12. As described above, in this embodiment, screws for fixing the cover member 13 to the resin sealing member 12 are not required and thus a component cost of the motor 3 can be reduced. Further, in this embodiment, even when the resin sealing member 12 is formed of BMC, the protrusion 12h can be easily formed in a molding step of the resin sealing member 12 and thus a manufacturing cost of the motor 3 can be reduced. Therefore, according to this embodiment, a cost of the motor 3 can be reduced.

In this embodiment, the tube section 13a is formed with the connected part 13t by which both ends in the upper and lower direction of each of the engagement grooves 13q to 13s are connected on respective counterclockwise direction sides of the engagement grooves 13q to 13s. Therefore, according to this embodiment, even when the engagement grooves 13q to 13s are formed in the tube section 13a so as to be extended from the upper end sides of the notch sections 13h to 13j in the circumferential direction, strengths of portions of the tube section 13a where the engagement grooves 13q to 13s are formed are increased. Further, in this embodiment, both ends in the upper and lower direction of the engagement groove 13p are not connected with each other on the counterclockwise direction side of the engagement groove 13p and thus the elastic piece 13v where the stopper 13k is formed can be easily resiliently bent in the upper and lower direction. As a result, the stopper 13k is easily engaged with the protrusion 12h.

In this embodiment, the cover member 13 is positioned in the circumferential direction with respect to the resin sealing member 12 by the protrusion 12h engaged with the engagement groove 13p and the stopper 13k and by the protrusion 12h engaged with the engagement groove 13r and the engagement groove 13r. In addition, the cover member 13 is positioned in the upper and lower direction with respect to the resin sealing member 12 by the protrusion 12h engaged with the engagement groove 13r and the engagement groove 13r, by the protrusion 12h engaged with the engagement groove 13q and the engagement groove 13q, and by the protrusion 12h engaged with the engagement groove 13s and the engagement groove 13s. Therefore, according to this embodiment, in the circumferential direction and the upper and lower direction, the cover member 13 is positioned with the resin sealing member 12 in a well-balanced manner.

In this embodiment, the protruded parts 13w protruded to the upper side are formed on the lower side faces of the engagement grooves 13q to 13s and the upper end faces of the protruded parts 13w are contacted with the under faces of the protrusions 12h which are engaged with the engagement grooves 13q to 13s. Therefore, according to this embodiment, the cover member 13 can be positioned in the upper and lower direction with respect to the resin sealing member 12 with a high degree of accuracy.

In this embodiment, the exposed face 24d which is a part of the upper end face 24c of the stator core 24 is disposed on the same plane as the upper faces 12j of the protrusions 12h of the resin sealing member 12. Therefore, according to this embodiment, when the stator 6 is to be disposed in a die for forming the resin sealing member 12, the stator 6 can be disposed in the die with the exposed face 24d as a reference surface and thus the upper faces 12j of the protrusions 12h can be formed with a high degree of accuracy. Further, in this embodiment, the upper side faces of the engagement grooves 13q to 13s of the cover member 13 are abutted with the upper faces 12j of the protrusions 12h and thereby the cover member 13 is positioned in the upper and lower direction with respect to the resin sealing member 12. Therefore, the resin sealing member 12 and the cover member 13 can be positioned in the upper and lower direction with a high degree of accuracy. In addition, in this embodiment, the bearing 17 is fixed to the bottom part 13b of the cover member 13 in a state that the flange part of the bearing 17 is disposed on a lower side, and the bearing 18 is fixed to the bottom part 12b of the resin sealing member 12 in a state that the flange part of the bearing 18 is disposed on an upper side.

Therefore, according to this embodiment, variation of a gap space can be restrained which is formed at least one of a gap space in the upper and lower direction between the bearing plate 19 fixed to the upper end side of the sleeve 16 and the flange part of the bearing 17 and a gap space in the upper and lower direction between the bearing plate 20 fixed to the lower end side of the sleeve 16 and the flange part of the bearing 18.

In this embodiment, the adhesive filling space 30 is formed between the small diameter outer peripheral face 12d of the resin sealing member 12 and the small diameter inner peripheral face 13e of the cover member 13 in the radial direction, and an adhesive 31 is filled in the adhesive filling space 30. Therefore, according to this embodiment, fixed strength of the cover member 13 to the resin sealing member 12 can be increased by the adhesive 31 which is filled in the adhesive filling space 30. Further, according to this embodiment, entering of the fluid to an inside of the motor 3 can be restrained by the adhesive 31 filled in the adhesive filling space 30. Specifically, the adhesive 31 makes it possible to suppress the intrusion of the fluid to the inner peripheral side of the stator 6.

Modification Example of Cover Member

Figure 7:
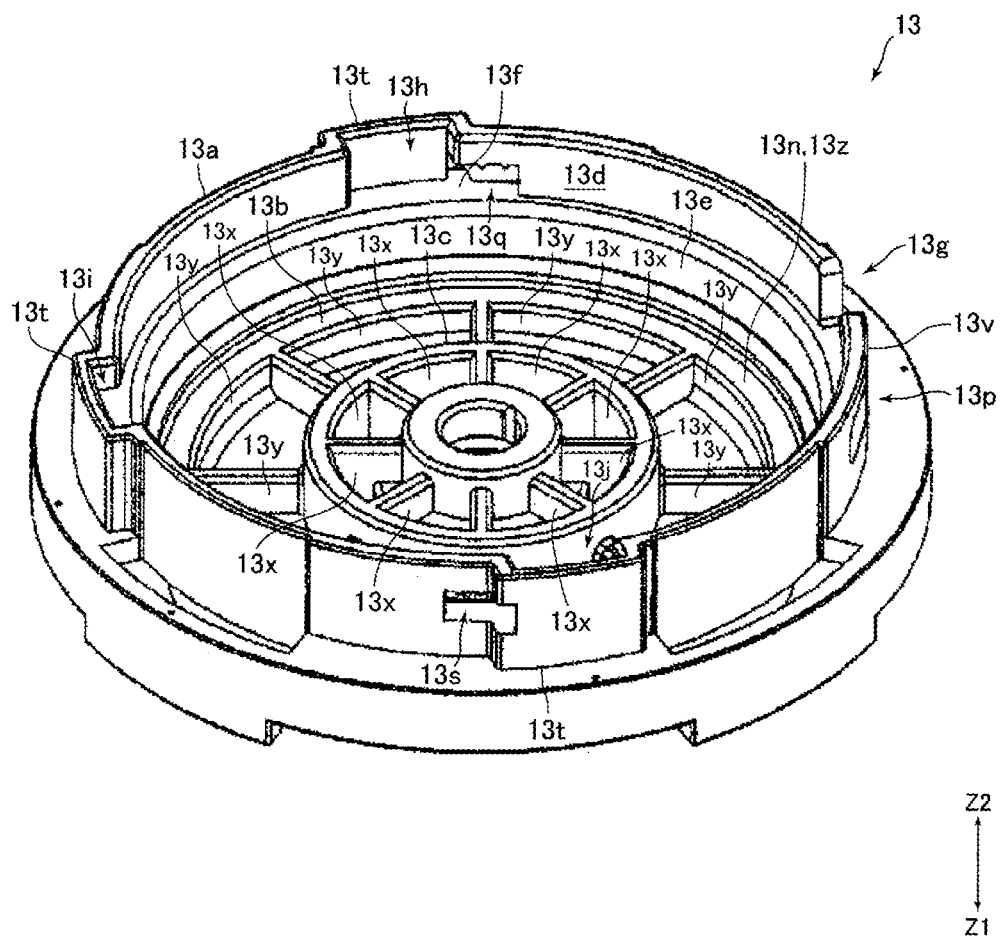
FIG. 7 is a perspective view of a cover member according to another embodiment of the present invention.

FIG. 7 is a perspective view of the cover member 13 according to another embodiment of the present invention.

In the embodiment described above, as shown in FIG. 7, recesses 13x and 13y may be formed in the bottom part 13b for suppressing sink marks on the bottom part 13b of the cover member 13 which is a resin component. Specifically, the plurality of recesses 13x for suppressing sink marks of the circular ring-shaped part 13c are formed to recessed upward from the under face of the circular ring-shaped part 13c. The plurality of recesses 13y for suppressing the sink mark on the bottom part 13b in the outer portion in the radial direction with respect to the circular ring-shaped part 13c may be formed to recessed upward from the under face of the outer portion in the radial direction more than the circular ring-shaped part 13c of the bottom part 13b.

The plurality of recesses 13x are formed in the circumferential direction at predetermined intervals, and ribs are formed between the recesses 13x in the circumferential direction. Further, the plurality of recesses 13y are formed in the circumferential direction at predetermined intervals, and ribs are formed between the recesses 13y in the circumferential direction. The under face 13n of the bottom part 13b is configured by lower end faces of the plurality of ribs formed between the recesses 13y and an annular lower face 13z disposed on the outer side in the radial direction of the plurality of recesses 13y. In FIG. 7, the same components as those described above are denoted by the same reference numerals.

Modification Example of Arrangement Position of Adhesive

Figure 8:
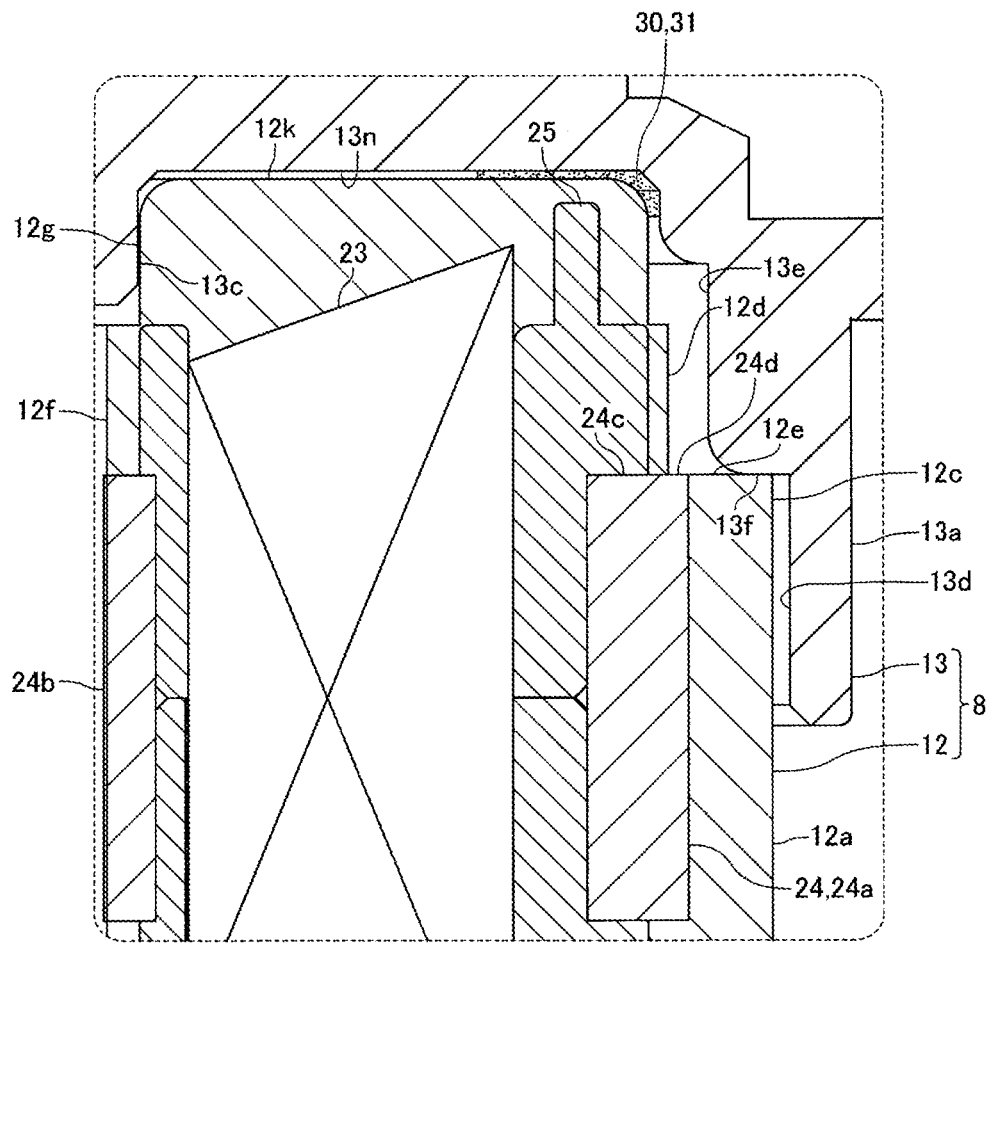
FIG. 8 is an enlarged cross-sectional view illustrating an arrangement position of an adhesive according to another embodiment of the present invention.

FIG. 8 is an enlarged cross-sectional view illustrating the arrangement position of the adhesive 31 according to another embodiment of the present invention. FIG. 8 illustrates a portion corresponding to the F portion of FIG. 1. In addition, in FIG. 8, the same components as those described above are denoted by the same reference numerals.

In the embodiment described above, the adhesive 31 is disposed between the small diameter outer peripheral face 12d of the resin sealing member 12 and the small diameter inner peripheral face 13e of the cover member 13 opposed in the radial direction. As shown in FIG. 8, while the adhesive 31 is disposed between the small diameter outer peripheral face 12d and the small diameter inner peripheral face 13e, the adhesive 31 may be disposed between the upper end face 12k of the resin sealing member 12 and the under face 13n of the cover member 13 opposed in the vertical direction. Specifically, the adhesive 31 may be disposed at the upper end portion between the small diameter outer peripheral face 12d and the small diameter inner peripheral face 13e, and at the radially outer portion between the upper end face 12k and the under face 13n.

In this case, the small diameter outer peripheral face 12d and the upper end face 12k are the first opposite face facing the cover member 13, and the small diameter inner peripheral face 13e and the under face 13n are second opposite faces facing the small diameter outer peripheral face 12d and the upper end face 12k, which are the first opposite faces. That is, the under face 13n which is a part of the second opposite face is disposed above the upper end face 12k which is a part of the first opposing face. In addition, the small diameter inner peripheral face 13e, which is a part of the inner peripheral face of the tube section 13a, is another part of the second opposite face and the small diameter outer peripheral face 12d, which is a part of the outer peripheral face of the resin sealing member 12, is the other part of the first opposite face. Furthermore, the first opposite face and the second opposite face are opposed in the vertical direction and in the radial direction. Moreover, the first opposite face and the second opposite face are formed over the entire area in the circumferential direction. Further, the adhesive filling space 30 is formed between the small diameter outer peripheral face 12d and the small diameter inner peripheral face 13e, and between the upper end face 12k and the under face 13n as an arrangement space in which the adhesive 31 is arranged.

In addition, in this case, when the cover member 13 is fixed to the upper end side of the resin sealing member 12, the uncured adhesive 31 is applied over the entire area in the circumferential direction at the outer end portion of the upper end face 12k in the radial direction. Moreover, in the modification example of the cover member 13 shown in FIG. 7, when the cover member 13 is incorporated into the resin sealing member 12, some of the uncured adhesive 31 applied to the upper end face 12k flows radially inward along the lower end face of the rib between the recesses 13y. The recess 13y functions as an adhesive reservoir in which some of the adhesive 31 is collected.

In the modification example shown in FIG. 8, for example, if the cover member 13 is fixed to the resin sealing member 12 with the upper end face 12k to which the uncured adhesive 31 is applied facing upward, the uncured adhesive 31 applied to the upper end face 12k becomes less likely to flow from the upper end face 12k to other places. Therefore, when the adhesive 31 is disposed between the small diameter outer peripheral face 12d and the small diameter inner peripheral face 13e as in the embodiment described above, and the cover member 13 is fixed to the resin sealing member 12, for example, as compared with the case where the adhesive 31 before curing is applied to the small diameter outer peripheral face 12d, in the present modification example, the work of fixing the cover member 13 to the resin sealing member 12 can be more easily performed.

The adhesive 31 may be disposed throughout the area between the small diameter outer peripheral face 12d and the small diameter inner peripheral face 13e and throughout the area between the upper end face 12k and the under face 13n. In addition, the adhesive 31 may be disposed only between the upper end face 12k and the under face 13n without the adhesive 31 being disposed between the small diameter outer peripheral face 12d and the small diameter inner peripheral face 13e. In this case, the upper end face 12k is the first opposite face facing the cover member 13, and the under face 13n is the second opposite face facing the upper end face 12k, which is the first opposite face.

Modification of Intrusion Restraint Member

In the embodiment described above, an intrusion restraint member for restraining entry the fluid into the inner peripheral side of the stator 6 is the adhesive 31. However, the intrusion restraint member may be a semi-solid composition having no adhesiveness. For example, the intrusion restraint member may be a caulking agent, a caulking material, or grease which is a semi-solid lubricant. Further, the intrusion restraint member for restraining the entry of the fluid into the inner peripheral side of the stator 6 may be a sealing member which is formed of an elastic member and formed in an annular shape. For example, the intrusion restraint member may be an O-ring or the like.

However, in the case where the intrusion restraint member is a sealing member such as an O-ring, when the cover member 13 is fixed to the resin sealing member 12, there is a possibility that the seal member may be twisted. Particularly, in the embodiment described above, after the cover member 13 is assembled with the resin sealing member 12 from the top down, the cover member 13 is turned counterclockwise with respect to the resin sealing member 12 and the cover member 13 is fixed to the resin sealing member 12. Therefore, in the case where the cover member 13 is fixed to the resin sealing member 12, the seal member may be twisted. Therefore, it is necessary to fix the cover member 13 to the resin sealing member 12 so as not to generate a twist in the sealing member, and the work of fixing the cover member 13 to the resin sealing member 12 becomes complicated. On the other hand, when the intrusion restraint member is the adhesive 31 or the semi-solid composition, the intrusion restraint member is not twisted when the cover member 13 is fixed to the resin sealing member 12. This makes it possible to easily perform the operation of fixing the cover member 13 to the resin sealing member 12.

OTHER EMBODIMENTS

Although the disclosure has been shown and described with reference to a specific embodiment, various changes and modifications will be apparent to those skilled in the art from the teachings herein.

In the embodiment described above, predetermined members may be inserted into the notch sections 13h to 13j and an adhesive may be filled in the notch sections 13h to 13j. In this case, fixed strength of the cover member 13 to the resin sealing member 12 can be increased. Further, in the embodiment described above, two protruded parts 13w are formed on the lower side faces of the engagement grooves 13q to 13s. However, one or three or more protruded parts 13w may be formed on the lower side faces of the engagement grooves 13q to 13s. Further, the protruded part 13w may be formed on the upper side faces of the engagement grooves 13q to 13s instead of the lower side faces of the engagement grooves 13q to 13s and, alternatively, in addition to the lower side faces of the engagement grooves 13q to 13s.

In the embodiment described above, four protrusions 12h are disposed at a pitch of 90°. However, the four protrusions 12h may be disposed at a pitch of other than 90°. Further, in the embodiment described above, four protrusions 12h are formed in the resin sealing member 12. However, the number of the protrusions 12h formed in the resin sealing member 12 may be 2, 3 or 5 or more. In this case, the cover member 13 is formed with notch sections 13g to 13j and engagement grooves 13p to 13s corresponding to the number of the protrusions 12h.

In the embodiment described above, the cover member 13 is formed with one stopper 13k. However, two or more stoppers 13k may be formed in the cover member 13. Further, in the embodiment described above, the connected part 13t is formed so as to connect both ends in the circumferential direction of each of the notch sections 13h to 13j. However, the connected part 13t may be formed so as not to connect both ends in the circumferential direction of each of the notch sections 13h to 13j. Further, in the embodiment described above, no connected part 13t may be formed in the cover member 13.

In the embodiment described above, no adhesive 31 is filled in a space in the radial direction between the small diameter outer peripheral face 12d and the small diameter inner peripheral face 13e (adhesive filling space 30). Further, in the embodiment described above, the exposed face 24d, the step face 12e and the upper face 12j may be offset in the upper and lower direction. Further, in the embodiment described above, the motor 3 is used in the pump device 1.

However, the motor 3 may be used other than the pump device 1. Furthermore, in the embodiment described above, although the cover member 13 is fixed to the resin sealing member 12 by the snap fit using the elastic piece 13v and the protrusion 12h, the cover member 13 may be fixed to the resin sealing member 12 by a fixing method other than the snap fit.

DESCRIPTION OF THE REFERENCE SYMBOLS

3 Motor
5 Rotor
6 Stator
12 Resin sealing member
12c Large diameter outer peripheral face
12d Small diameter outer peripheral face (outer circumferential face of resin sealing member in first direction side than protrusion, first opposite face)
12e Stepped face (first contact face)
12g Large diameter inner peripheral face (contact face)
12h Protrusion
12j Upper face (face of protrusion in first direction side)
12k Upper end face (first opposite face)
13 Cover member
13a Tube section (cover part)
13c Circular ring-shaped part
13d Large diameter inner peripheral face
13e Small diameter inner peripheral face (inner circumferential face of cover part in first direction side than protrusion, second opposite face)
13f Step face (second contact face)
13g to 13j Notch section
13k Stopper
13n Under face (second opposite face)
13p Engagement groove (first engagement groove)
13q, 13s Engagement groove (second engagement groove)
13r Engagement groove (third engagement groove)
13t Connected part
13w Protruded part
14 Rotation shaft
15 Drive magnet
23 Drive coil
24 Stator core
24a Outer peripheral ring part
24b Salient pole parts
24c Upper end face (end face of outer peripheral ring part in first direction)
24d Exposed face
30 Adhesive filling space (disposition space)
31 Adhesive (intrusion restrain member)
Z1 First direction
Z2 Second direction

The invention claimed is:
1. A motor comprising:
a rotor having a rotation shaft and a drive magnet;
a stator which is formed in a tube shape and is disposed on an outer peripheral side of the rotor;
a resin sealing member made of a resin, wherein one direction in an axial direction of the rotor is referred to as a first direction and a direction opposite to the first direction is referred to as a second direction, and the resin sealing member at least covers a side in the second direction of the stator and the outer peripheral side of the stator; and
a cover member which is fixed to an end side in the first direction of the resin sealing member and supports the rotation shaft,
wherein the resin sealing member is formed with a plurality of protrusions which protrude from an outer peripheral face of the resin sealing member toward an outer side in a radial direction of the rotor,
wherein a portion of the cover member on a side in the second direction is formed to be a cover part in a tube shape which covers the resin sealing member from an outer peripheral side,
wherein the cover part is formed with
a plurality of notch sections which are cut out from an end in the second direction of the cover part to the first direction,
a plurality of engagement grooves which extend to one side in a circumferential direction of the rotor from respective end sides in the first direction of the plurality of notch sections and are respectively engaged with the plurality of protrusions, and
a stopper which restricts a movement of the cover member to the other side in the circumferential direction in a state in which the protrusions are engaged with the engagement grooves, and
wherein a width in the circumferential direction of each of the notch sections is wider than a width in the circumferential direction of each of the protrusions,
wherein the stopper is formed on an other end side in the circumferential direction of one of the engagement grooves, and
when the engagement groove where the stopper is formed is referred to as a first engagement groove, the cover part is formed with a plurality of connected parts each of which connects both ends in the axial direction on the other side in the circumferential direction of each of the engagement grooves other than the first engagement groove.

2. The motor according to claim 1, wherein each of the plurality of connected parts connects both ends in the circumferential direction of each of the notch sections other than the notch section connecting the first engagement groove, and covers each of the notch sections other than the notch section connecting the first engagement groove from an outer side in the radial direction.

3. The motor according to claim 1, wherein
four of the protrusions are formed in the resin sealing member at a predetermined pitch in the circumferential direction,
four of the notch sections and four of the engagement grooves are formed in the cover part at the same pitch in the circumferential direction as the four of the protrusions,
when each of two of the engagement grooves adjacent to the first engagement groove in the circumferential direction is referred to as a second engagement groove, and the remaining engagement groove of the four of the engagement grooves other than the first engagement groove and the second engagement grooves is referred to as a third engagement groove, the cover member is positioned in the circumferential direction with respect to the resin sealing member by the protrusion engaged with the first engagement groove and the stopper and by the protrusion engaged with the third engagement groove and the third engagement groove, and
the cover member is positioned in the axial direction with respect to the resin sealing member by the protrusions engaged with the second engagement grooves and the second engagement grooves and by the protrusion engaged with the third engagement groove and the third engagement groove.

4. The motor according to claim 1, wherein at least one of side faces on a first direction side of the engagement grooves and side faces on the second direction side of the engagement grooves is formed with a protruding part which protrudes in the axial direction.

5. The motor according to claim 1, wherein
the stator includes
  a plurality of drive coils, and
  a stator core provided with a plurality of salient pole parts each of which is wound with one of the plurality of drive coils and an outer peripheral ring part formed in a ring shape,
the plurality of salient pole parts protrude toward an inner side in the radial direction from the outer peripheral ring part,
an end face on the first direction side of the outer peripheral ring part and faces on the first direction side of the protrusions are formed to be flat faces perpendicular to the axial direction,
a part of the end face on the first direction side of the outer peripheral ring part is formed as an exposed face which is not covered by the resin sealing member, and
the faces on the first direction side of the protrusions and the exposed face are disposed on the same plane.

6. The motor according to claim 1, wherein
the cover member is formed with a circular ring-shaped part in a circular ring shape which is disposed on an inner side in the radial direction with respect to the cover part, and
a portion of the resin sealing member on the first direction side is formed with a contact face with which an outer peripheral face of the circular ring-shaped part comes in contact in the radial direction.

7. The motor according to claim 1, wherein
an adhesive filling space into which an adhesive is filled is formed in the radial direction between an outer peripheral face of the resin sealing member on the first direction side with respect to the protrusions and an inner peripheral face of the cover part on the first direction side with respect to the protrusions, and
the adhesive is filled in the adhesive filling space.

* * * * *